United States Patent [19]

Carnt et al.

[11] E Patent Number: Re. 32,209

[45] Reissued Date of Patent: Jul. 15, 1986

[54] TELEVISION APPARATUS RESPONSIVE TO A TRANSMITTED COLOR REFERENCE SIGNAL

[75] Inventors: Peter S. Carnt, Herriliberg/Zurich; George Schiess, Stallikon, both of Switzerland

[73] Assignee: RCA Corporation, Princeton, N.J.

[21] Appl. No.: 762,104

[22] Filed: Jan. 24, 1977

Related U.S. Patent Documents

Reissue of:

[64] Patent No.: 3,673,320
Issued: Jun. 27, 1972
Appl. No.: 121,842
Filed: Mar. 8, 1971

[30] Foreign Application Priority Data

Mar. 11, 1970 [GB] United Kingdom ..... 11687/70

[51] Int. Cl.[4] ..... H04N 9/68
[52] U.S. Cl. ..... 358/27; 358/28
[58] Field of Search ..... 358/27, 28, 10

[56] References Cited

U.S. PATENT DOCUMENTS

| | | | |
|---|---|---|---|
| 2,774,072 | 12/1956 | Loughlin | 358/16 |
| 2,840,703 | 6/1958 | Dobson | 358/20 |
| 3,267,210 | 8/1966 | Townsend | 358/28 |
| 3,368,030 | 2/1968 | Wiencek | 358/28 |
| 3,456,068 | 7/1969 | Wilhelmy | 358/28 |
| 3,571,499 | 3/1971 | Hansen et al. | 358/27 |
| 3,604,844 | 9/1971 | Ross | 358/27 |
| 3,637,924 | 1/1972 | Cecchin | 358/27 |
| 3,679,816 | 7/1972 | Avins et al. | 358/28 |

FOREIGN PATENT DOCUMENTS

| | | |
|---|---|---|
| 1173518 | 7/1964 | Fed. Rep. of Germany . |
| 2015588 | 3/1971 | Fed. Rep. of Germany . |
| 1446471 | 6/1966 | France . |
| 49-2846 | 1/1974 | Japan . |
| 7550 | 2/1957 | United Kingdom . |
| 1065026 | 4/1967 | United Kingdom . |

OTHER PUBLICATIONS

Lewis, "Proposed Subcarrier Pilot for NTSC-Type Colour Television", *Electronics and Power*, pp. 207, 208, Jun. 1964.

MacDiarmid et al, "Automatic Differential Gain and Phase Correction for Long-Distance Colour Television Links", *Wireless World*, pp. 113-115, Mar. 1965.

Auld et al, "A Continuous Simplified Single-Line Color-Bar (SCLB) Test Signal Facility in Color Cameras", *SMPTE*, vol. 77, No. 3, Mar. 1968., pp. 228-232.

"Color-Television Demonstrations," London, Oct. 26th to 29th and Nov. 5, 1964", *EBU Review*, Part A--Technical, p. 296, No. 88, Dec. 1964.

Neal, "A Brief History of the VIR: Vertical Interval Reference Signal", *Communications/Engineering Digest*, pp. 20-25, Jan. 1976.

*Primary Examiner*—John W. Shepperd
*Attorney, Agent, or Firm*—Eugene M. Whitacre; William H. Meagher

[57] ABSTRACT

A color reference signal is inserted during the vertical blanking interval of a transmitted television waveform, for utilization by the described apparatus in automatically setting the hue and saturation of the display of an NTSC or PAL receiver. The apparatus responds to the transmitted burst signal to lock the frequency of the sub-carrier oscillator of the receiver and to the transmitted reference signal to adjust the phase of its oscillations.

14 Claims, 3 Drawing Figures

TELEVISION APPARATUS RESPONSIVE TO A TRANSMITTED COLOR REFERENCE SIGNAL

Matter enclosed in heavy brackets [ ] appears in the original patent but forms no part of this reissue specification; matter printed in italics indicates the additions made by reissue.

FIELD OF THE INVENTION

This invention relates to color television receivers and, more particularly, to such apparatus as is capable of utilizing a reference signal inserted in the vertical blanking interval of a transmitted television waveform to improve the consistency of reproduced color.

Summary of the Invention

As will become clear hereinafter, apparatus constructed in accordance with the invention responds to this insertion of the reference signal to provide both automatic hue and saturation correction. As far as hue control is concerned, it will be seen that the reference signal is recovered at the receiver to control the phase of its sub-carrier oscillator, while the transmitted color burst signal is recovered and used to lock the oscillator in frequency. Because the reference signal is of much longer duration than the burst, it is substantially less subject to phase variations from such phenomena as standing waves and multipath, for example. Using the reference signal instead of the burst signal then provides a tighter control over the phase of the oscillator and improved color demodulation. Use of the periodically recurring burst to independently control the oscillator frequency, on the other hand, provides the apparatus with a speed of response and with a signal-to-noise ratio comparable to those exhibited by typical frequency and phase control arrangements where the burst signal alone is employed to set the oscillator as the reference against which the demodulation occurs.

As far as saturation control is concerned, it will be seen that the apparatus of the invention resembles known designs in developing an automatic chroma control signal to set the chrominance channel gain. However, instead of following the typical approach of using the amplitude of the color burst as the reference for maintaining a constant chrominance level, the described apparatus will be seen to operate with a pedestal of the recovered reference signal serving as the means for comparison. By selecting this pedestal of luminance amplitude and performing the comparison within one of the receiver's color matrix amplifiers, for example, any change in contrast control setting will then produce a corresponding change in the pedestal amplitude and an overall adjustment in the chrominance gain. Automatic tracking between the chrominance and luminance channels will then be automatically achieved. In addition, such focusing on the pedestal as the reference in maintaining the chrominance gain instead of the color burst amplitude substantially reduces the previous difficulties in stabilizing the amplitude of the chrominance signal due to the cumulative tolerances associated with the burst signal.

BRIEF DESCRIPTION OF THE DRAWINGS

These and other advantages of the invention will become more clearly understood from a consideration of the following description taken in connection with the accompanying drawings in which.

DETAILED DESCRIPTION OF THE DRAWINGS

Figure 1:
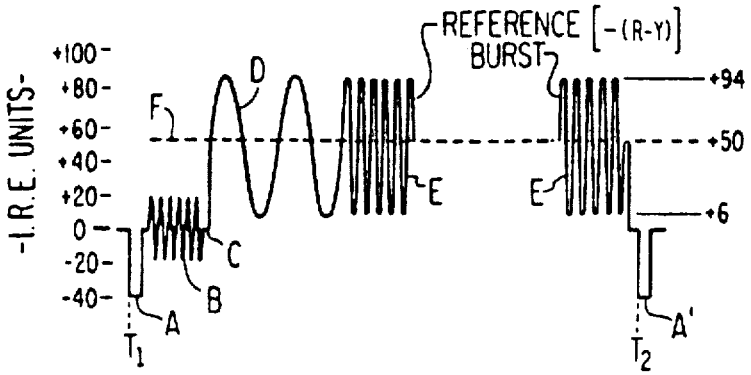
FIG. 1 illustrates a complete line within the vertical blanking interval of a transmitted television waveform, including a reference signal usable in accordance with the present invention.

FIG. 1 illustrates a preferred format for the color reference signal inserted into the transmitting waveform—for example, at line 20 of the vertical blanking interval of each television field. As shown, the line interval extends from time $T_1$ to time $T_2$, with a conventional horizontal deflection synchronizing pulse A of 40 IRE units amplitude extending in the negative direction at the beginning of the line. The pulse A is followed by a synchronizing burst B of color sub-carrier frequency (3.579545 MHz) and of —(B–Y) phase. The burst B, having a peak-to-peak amplitude of 40 IRE units, is superimposed upon a blanking pedestal C which, together with the burst and horizontal synchronizing pulse, forms a part of the conventional color television signal and, thus, need not be described further.

The remainder of the line interval includes a first burst D of a few cycles of lower frequency (for example, 0.5 MHz) followed by a second burst E of comparable amplitude but of sub-carrier frequency of predetermined —(R–Y) phase. Such burst E is superimposed upon a luminance pedestal F of some 50 IRE units in amplitude, with the peak amplitude of this burst being approximately 44 IRE units. Such selection for this second burst amplitude follows a realization that the gain of the chrominance channel to a signal of —(R–Y) phase is of the order of 1.14 and that automatic chroma control can be attained through a comparison of the amplitude of this second reference burst E after its increase by this factor (after demodulation) with the luminance level of 50 IRE units. For a sub-carrier burst E of —(B–Y) phase, on the other hand, the peak amplitude would generally be of the order of 25 IRE units since the receiver gain for such sub-carrier phase is approximately 2.03. The insertion of the lower frequency burst D (which is optional) can be used to facilitate the gating of the reference burst E from the composite signal, and is at a frequency which is a compromise between the maximum information which can be transmitted in the shortest period of time and the Q required to separate the reference signal.

Figure 2:
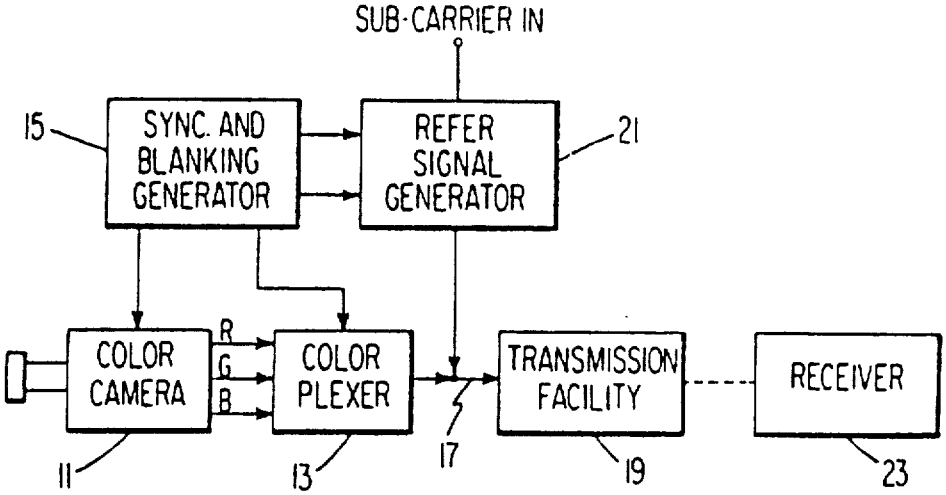
FIG. 2 illustrates, by way of a block diagram, one arrangement which might be employed in transmitting the reference signal together with a standard color television broadcast signal.

While the color reference signal E of the present invention may be inserted into the vertical interval at almost any point in the broadcast communication link between the camera and the receiver, the arrangement of FIG. 2 illustrates its insertion at the transmitting end. Thus, there is shown a conventional color television camera 11 which provides at its output leads simultaneous red "R," green "G," and blue "B" color video signals which are applied to the input terminals of a colorplexer 13 of appropriate design. Such colorplexer unit receives the simultaneous color video signals and synchronizing and blanking signals from a synchronizing generator 15, and produces luminance and chrominance signals through the agency of suitable modulating and matrix circuits. The luminance and chrominance signals as thus furnished by the colorplexer 13 are applied via a lead 17 to the transmission facilities represented by the block 19. The color reference signal generator providing the waveform of the type shown in FIG. 1 is indicated diagrammatically by a block 21 in FIG. 2, with the output signal of the generator being added to the composite broadcast signal at the input lead 17 of the transmission facility. It will also be noted from FIG. 2 that the reference signal generator 21 receives, at its input terminals, horizontal and vertical drive pulses from the synchronizing generator 15 together with a color sub-carrier wave. The sub-carrier wave may be derived from the same source as that which supplies the sub-carrier wave to the colorplexer apparatus, in order to insure a locked relation between the color reference signal burst of the vertical blanking interval and the color television signal synchronizing burst on the back porch portion of the horizontal pulse.

The transmission facility represented by the block 19 will be understood as including any of the usual signal conveying links normally employed in commercial broadcast systems. Completing the illustration of the system is a receiver 23 which serves to reproduce the televised image from the composite signal applied to its input terminal via the transmission facility, and on whose image display device will appear the reproduced image corrected as to hue and saturation by the apparatus of the invention, now to be described.

Figure 3:
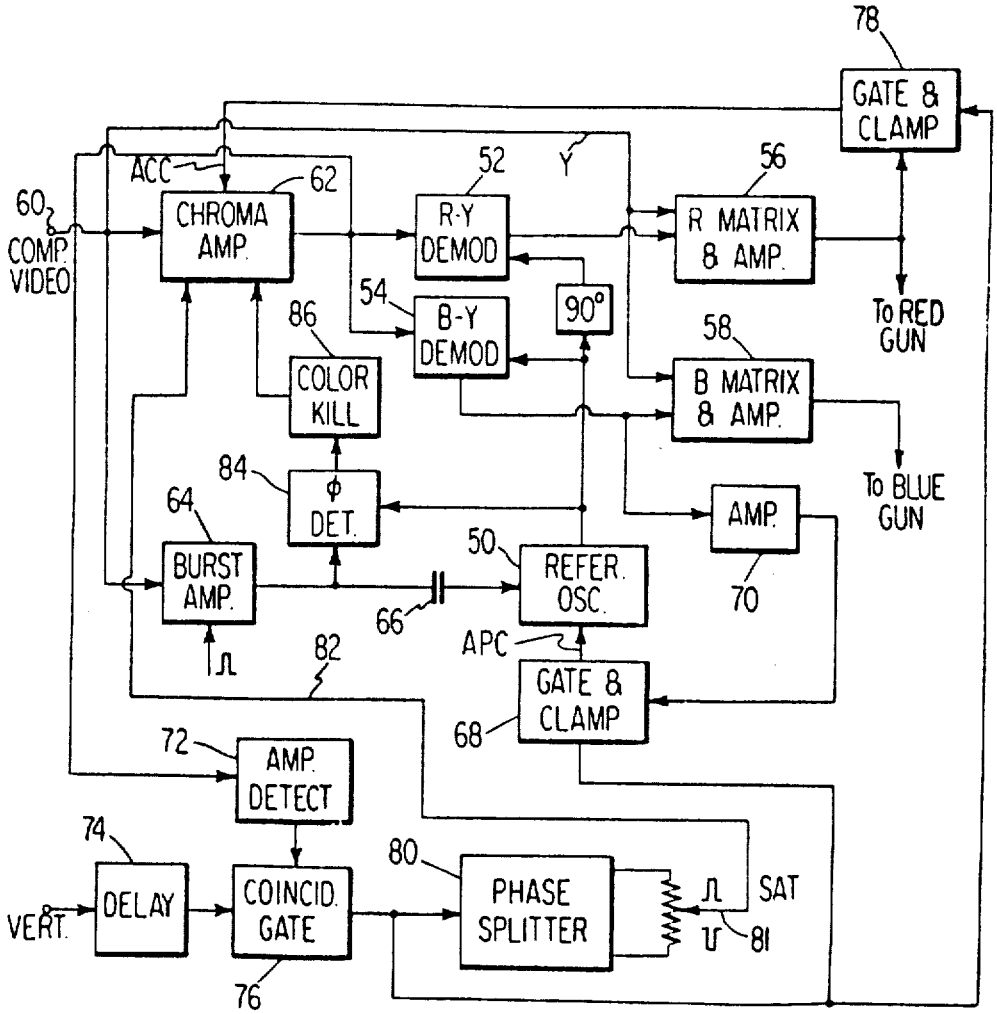
FIG. 3 illustrates, also by way of block diagram, apparatus responsive to such reference signal for achieving automatic hue and saturation correction in the receiver to improve the quality and consistency of reproduced color images.

The apparatus of FIG. 3 is useful in an R–Y and B–Y low-level demodulating system in which 90° phase separation is present between the sub-carrier signal coupled from the receiver's reference oscillator 50 to the R–Y and B–Y demodulators 52, 54. The output signals from these demodulators are respectively applied to a pair of matrix and amplifier circuits 56 (red), 58 (blue) for combination with a luminance or Y signal applied to an additional input thereof—from, for example, the first video stage of the receiver. The output signals from the matrix circuits 56, 58 are applied to appropriate electrodes of a cathode-ray kinescope (not shown), to form—with a green signal recovered from the red and blue information—the reproduced image in full color. As indicated, the composite video signal is coupled from input terminal 60 to the individual demodulator circuits 52, 54 by means of a chroma amplifying system 62 which sets the frequency response for the chrominance channel.

In accordance with the present invention, the synchronizing burst portion of the composite signal (B, in FIG. 1) is employed to lock the frequency of the reference oscillator 50 but not its phase. In this respect, the apparatus of the invention in part distinguishes from apparatus previously utilized in the prior art. To this end, the composite video signal applied at terminal 60 is coupled to a burst amplifier 64 which is keyed by a gate pulse supplied from the deflection and high voltage circuitry of the receiver, to separate the color synchronizing bursts from the remainder of the composite waveform. The separated bursts are applied by a relatively large value coupling capacitor 66 to the reference oscillator 50 to lock the frequency of the oscillator to that of the received burst signal. Because the burst is transmitted at the rate of once every television line, this capacitive coupling acts as a short circuit to the burst, and rapidly couples it to lock the oscillator 50 in proper frequency. Such a periodically recurring burst thus provides the apparatus with a speed of response when switching between channels comparable to that exhibited in known NTSC and PAL receiver systems where the color synchronizing burst is employed to additionally lock the phase of the reference sub-carrier oscillator, as well. As will be readily appreciated [, this alternating current coupling of the synchronizing bursts to the oscillator 50 has substantially little effect on the steady state phase of its oscillations, as this is governed by the direct voltage on the oscillator reactance device. However—and in accordance with the present invention—such control over the reactance device is effected by the transmitted reference signal (E, in FIG. 1), in combination with a direct current coupling to the reactance control] *after consideration of the to-be-described closed loop control of the phase of the oscillator output in accordance with the transmitted reference signal (E, in FIG. 1), that the phase of the oscillator output is locked to the phase of said reference signal; in those instances where there is a sustained difference between the phase of the burst and the phase of the reference signal, the differing phase of the bursts will have substantially little effect on the steady state phase of the oscillator which will be locked to the phase of the reference signal by the action of a reference signal responsive control voltage DC coupled to the oscillator reactance device.*

This phase-locking of the oscillator 50 to complete the hue control aspect of the present invention is attained by sampling the output of the B–Y demodulator 54 during the vertical blanking interval in which the color reference signal is inserted. Because the color reference signal is inserted at —(R–Y) phase, the output of the demodulator 54 should nominally be zero when the reference signal phase and oscillator phase are the same. Should any difference exist between these two phases, a correction voltage will be developed to adjust the oscillator phase until the detected B–Y component is reduced to zero, at which time the oscillator phase will lie along the R—Y axis.

Such automatic phase control action is achieved in the apparatus of FIG. 3 first, through the use of a gate and clamp circuit 68 coupled to receive the output of the B–Y demodulator 54 after amplification in an amplifier unit 70. Control of the gate 68 is, in turn, controlled by the second operative circuits associated with this phase control, namely an amplitude detector 72, a delay circuit 74 and a coincidence gate 76. In particular, these units 72–76 cooperate to provide a clamp pulse during the vertical blanking interval in which the color reference signal is inserted, by coupling the amplitude detector 72 to receive the processed signal output of the chroma amplifying system 62 and by applying its own output, in turn, to the coincidence gate 76 along with a pulse timed to coincide with the blanking position of interest—shown as being developed by the delay circuit 74 counting down to the appropriate line interval in response to an applied vertical synchronizing rate pulse. The output of the gate circuit 68 will be understood as being direct current coupled to the reactance device of the oscillator 50, and provides an oscillator phase control for color reference signals E to reduce the detected B–Y component towards zero. As will be seen, such control is independent of the phase of the color synchronizing burst B.

This usage of a color reference signal to establish the hue of a reproduced color image represents a significant improvement over known NTSC designs as the reference signal is far less susceptible to phase shift errors due to its significantly longer duration than the color synchronizing burst. Thus, where the reference signal might occupy a 24 microsecond or so time interval and multipath conditions may be such as to introduce a 2.5 microsecond delay, only a 0.1 radian phase change would tend to be exhibited by large area chrominance information, whereas such display would be substantially influenced and affected if the same delay were present and the 2.5 microsecond burst were itself used to provide the phase control.

However, the use of this burst signal to separately lock the frequency of the sub-carrier oscillator of the receiver is advantageous—not only because of its maintaining a comparable speed of operating response—, but because it enhances the exhibited signal-to-noise ratio over that which would be exhibited if only the reference signal were employed for the hue correction. This follows from the periodic recurrence of the synchronizing burst every television line, as compared to the presence of the color reference signal only once each television field. [Such singular use] *Use* of a reference signal to correct the hue of a reproduced image is disclosed in U.S. Pat. No. 3,456,068-Wilhelmy, the described apparatus of which [suffers the disadvantages of slow response and poor signal-to-noise ratio improved upon by the concurrent use of the color synchronizing burst as herein described] *makes use of a reference signal which occurs during a small portion of image display intervals.*

The apparatus of FIG. 3 further represents an improvement over the construction suggested by the aforementioned patent in that provision is additionally made to use the same color reference signal for control of the saturation of the reproduced color display. To this end, a second gate and clamp unit 78 is included, having a first input coupled to sense the output of the red matrix 56 and a second input controlled by the clamp pulse generated by the combined actions of the units 72–76. As with the B–Y demodulator 54 for phase control, the output of the matrix 56 will ideally be zero during the blanking interval insertion of the reference signal. The reason for this is that with a reference signal of —(R–Y) phase and with the pedestal upon which the reference bursts are superimposed having an amplitude equal to the luminance signal, the output of the R–Y demodulator 52 will comprise a pulse having an amplitude equal in magnitude but opposite in polarity to that of the luminance component of the composite video signal. With such component being applied to the matrix amplifier 56, as shown, the gating unit 78 will convert any output from the matrix 56 which is not zero into an automatic chroma control signal for application to the amplifying system 62 to set the chrominance channel gain.

Using the pedestal of the color reference signal as the measure for developing this control signal instead of focusing on the energy content of the color synchronizing burst obviates many of the previous difficulties existent in prior designs where the cumulative tolerances associated with the burst amplitude deleteriously affected this automatic gain control of the chroma amplifiers. A second advantage of utilizing a color reference signal of the type described in providing saturation control follows from a realization that should the contrast control of the receiver be adjusted, a correction voltage of corresponding polarity will be developed to adjust the chrominance gain in like manner. Automatic tracking is thus achieved without the need for any common coupling action between the control employed and the luminance and chrominance portions of the receiver.

A manual saturation control can be included in the apparatus of FIG. 3 by utilizing a phase splitter 80 coupled to the output of the coincidence gate 76, and by adjusting its variable output arm 81 to produce either a positive or negative pulse in time synchronism with the color reference signal and, preferably, derived from it. Such pulse signal can simulate an error signal of the type described in conjunction with the matrix 56, and can cause the automatic chroma control circuit to vary the chrominance gain in appropriate manner when the pulse signal is coupled to the amplifier system 62 by the conductor 82.

The burst amplifier 64 and reference oscillator 50 are additionally shown as being coupled to a phase detector 84 for developing a control voltage which, when applied via a color killer amplifier 86 to the chroma amplifying system 62, will de-activate the chrominance channel and eliminate the possibility of color "noise" being displayed on the cathode-ray kinescope during monochrome reception. Each of the units shown in FIG. 3 are either readily available devices, or ones which can easily be constructed by one skilled in the art.

While there has been described what is considered to be a preferred embodiment of the present invention, it will be readily apparent that modifications may be made without departing from the spirit and scope of the instant disclosure. Thus, while the color reference signal has been described as being of —(R–Y) phase, it will be recognized that a phase of —(B–Y) might be used as well, and still utilize the teachings herein. With such modification, it will be noted that the automatic phase control (APC) signal for hue correction would be developed through a sensing of the output of the R–Y demodulator 52 instead of the B–Y demodulator 54. It will similarly be noted that the automatic chroma control (ACC) signal for saturation correction would be developed by sensing the output of the blue matrix 58, rather than the red matrix 56.

This use of a vertical reference signal at the receiver to improve the quality of operation and the consistency of a reproduced color represents one step further than that recently proposed by the Broadcast Television Systems Committee of the Electronic Industries Association. There, although a color reference signal was inserted into the vertical blanking interval for reducing errors in reproduced hue and saturation, the signal was utilized in adjusting the phase and amplitude of the transmitted chrominance signal and the level of color burst, amongst others, so as to radiate a signal corresponding to the one which was originated in the video system where the correct amplitude and phase of the composite signal was established. As will be readily appreciated, such phenomena as multipath, transmission line reflection and differential phase errors could very will upset these relationships in transmission to the receiver. Although such use of a vertical interval reference signal (VIR) could very well lessen those characteristics of television studio and network operation which adversely affect hue and saturation, the apparatus of the invention goes one step beyond in utilizing these reference signals to offset many of the disturbances during transmission which would otherwise reduce the benefits such certification would provide.

What is claimed is:

1. In a color television receiver adapted to receive a television signal including a luminance component, a chrominance component modulated in both phase and amplitude, periodically recurring color synchronizing bursts occupying prescribed intervals during the horizontal retrace portions of said signal and a color reference signal *fully* occupying a prescribed interval during the vertical retrace portion of said signal, apparatus comprising:

first means for providing an oscillatory signal to demodulate said chrominance component [and produce color difference signals containing information proportional to the hue and saturation of the televised scene]

*second means including at least first and second chrominance signal demodulators responsive to said oscillatory signal, and also responsive to said television signal, for demodulating said chrominance component and producing color difference signal outputs representative of the hue and saturation of the televised scene, said reference signal being in quadrature phase relationship with respect to the demodulation axis associated with said first demodulator;*

[second] *third* means responsive to said television signal for recovering the color synchronizing bursts thereof and for coupling said bursts to said first means to lock at least the frequency of the oscillatory signal provided thereby to the frequency of such bursts; and

[third] *fourth* means, also responsive to said television signal, for recovering said color reference signal and for utilizing said signal to develop a control signal for said first means to adjust the phase of said oscillatory signal as a function of said reference signal, *said fourth means comprising the combination of (a) a frequency selective amplifier for delivering said chrominance and color reference signal components of said television signal to said demodulators, (b) said first demodulator, and (c) means for sensing the output of said first demodulator during the occurrence of said reference signal and deriving said control signal therefrom;* whereby the degree of error in the hue of a reproduced color image attributable to such transmission characteristics as multipath, transmission line reflection and the like is correspondingly reduced[.]

*wherein there is additionally included fifth means, responsive to said delivery of said color reference signal to said second demodulator via said amplifier, for controlling the amplitude of said color difference signals and the saturation of the reproduced color image as a function of departures of the amplitude of said delivered reference signal from a reference level responsive to the luminance component level exhibited during said prescribed interval.*

2. [The apparatus of claim 1] *In a color television receiver adapted to receive a television signal including a luminance component, a chrominance component modulated in both phase and amplitude, periodically recurring color synchronizing bursts occupying prescribed intervals during the horizontal retrace portions of said signal and a color reference signal occupying a prescribed interval during the vertical retrace portion of said signal, apparatus comprising:*

*first means for providing an oscillatory signal to demodulate said chrominance component;*

*second means including at least first and second chrominance signal demodulators responsive to said oscillatory signal, and also responsive to said television signal, for demodulating said chrominance component and producing color difference signal outputs representative of the hue and saturation of the televised scene, said reference signal being in quadrature phase relationship with respect to the demodulation axis associated with said first demodulator;*

*third means responsive to said television signal for recovering the color synchronizing bursts thereof and for coupling said bursts to said first means to lock at least the frequency of the oscillatory signal provided thereby to the frequency of such bursts; and*

*fourth means also responsive to said television signal, for recovering said color reference signal and for utilizing said signal to develop a control signal for said first means to adjust the phase of said oscillatory signal as a function of said reference signal, said fourth means comprising the combination of (a) a frequency selective amplifier for delivering said chrominance and color reference signal components of said television signal to said demodulators, (b) said first demodulator, and (c) means for sensing the output of said first demodulator during the occurrence of said reference signal and deriving said control signal therefrom;*

*whereby the degree of error in the hue of a reproduced color image attributable to such transmission characteristics as multipath, transmission line reflection and the like is correspondingly reduced; and*

*wherein there is additionally included fifth means, responsive to said delivery of said color reference signal to said second demodulator via said amplifier, for controlling the amplitude of said color difference signals and the saturation of the reproduced color image as a function of departures of the amplitude of said delivered reference signal from a reference level responsive to the luminance component level exhibited during said prescribed interval; and* wherein [there is additionally included fourth means for coupling the chrominance component of said television signal for demodulation with said oscillatory signal to produce said color difference signals, and wherein fifth means is also included to respond to corresponding coupling of said color reference signal via said fourth means to control the amplitude of said color difference signals and the saturation of the reproduced color image as a function of the amplitude of said reference signal] *said fifth means includes means for matrixing the output of said second demodulator with said luminance component, means responsive to the output of said matrixing means during said color reference signal occurrence for developing a gain control voltage, and means for utilizing said gain control voltage to control the gain of said amplifier.*

3. The apparatus of claim 2 wherein [sixth] *seventh* means is also included, coupled to said first, [second] *third* and fourth means, respectively, and responsive to the presence of said provided oscillatory signal and to said recovered color synchronizing bursts to disable said fourth [means] *amplifier* during the monochrome transmission of a televised scene and in the absence of said synchronizing bursts.

[4. The apparatus of claim 2 wherein said second means couples the recovered color synchronizing bursts to said first means to lock the frequency of said oscillatory signal to the frequency of said synchronizing bursts and wherein said third means couples said control signal to said first means to lock the phase of said oscillatory signal to the phase of said color reference signal.]

5. The apparatus of claim 4 wherein said [first] *sixth* means [includes a reactance control device responsive to alternating current signals to regulate the frequency of said provided oscillatory signals and to direct current signals to regulate the phase of said oscillatory signals, wherein said second means alternating current couples the recovered color synchronizing burst to said reactance control device and wherein said third means direct current couples said control signal to said reactance device] *comprises means for modifying one of the signal inputs to said matrixing means, said signal input modifying means including a potentiometer with a tap subject to manual adjustment of its position to control the modification of said one signal input in such manner that the existence, magnitude and sense of said simulated saturation error is dependent upon the position of adjustment of said tap.*

6. The apparatus of claim 5 for use in a color television receiver providing color difference signals along R–Y and B–Y demodulation axes and operative with a television signal including said color reference signal at —(R–Y) phase, wherein said [third means includes] *sensing* means [for monitoring] *monitors* the amplitude of the color difference signals provided along said B–Y demodulation axis and [to develop] *develops* said control signal for said first means to adjust the phase of said oscillatory signal to reduce the amplitude of said B–Y color difference signal *output during said color reference signal occurrence* in a direction to automatically compensate for transmission characteristic changes as would adversely affect the hue of the reproduced color image.

7. The apparatus of claim 5 for use in a color television receiver providing color difference signals along B–Y and R–Y demodulation axes and operative with a television signal including said color reference signal at —(B–Y) phase, wherein said [third means includes] *sensing* means [for monitoring] *monitors* the amplitude of the color difference signals provided along said R–Y demodulation axis and [to develop] *develops* said control signal for said first means to adjust the phase of said oscillatory signal to reduce the amplitude of said R–Y color difference signal *output during said color reference signal occurrence* in a direction to automatically compensate for transmission characteristic changes as would adversely affect the hue of the reproduced color image.

8. The apparatus of claim 6 wherein said [fifth means includes means for monitoring the amplitude of the color difference signal provided] *second demodulator effects demodulation* along said R–Y demodulation axis [and to develop said control signal for said fourth means to adjust the gain thereof to reduce the amplitude of said R–Y color difference signal in a direction to automatically compensate for transmission characteristic changes as would adversely affect the saturation of the reproduced color image].

9. The apparatus of claim [6] *7* wherein said [fifth means includes means for monitoring the amplitude of the color difference signal provided] *second demodulator effects demodulation* along said B–Y demodulation axis [and to develop said control signal for said fourth means to adjust the gain thereof to reduce the amplitude of said B–Y color difference signal in a direction to automatically compensate for transmission characteristic changes as would adversely affect the saturation of the reproduced color image].

*10. The apparatus of claim 2 also including sixth means for selectively causing said matrixing means to provide an output during said prescribed interval which is inclusive of a component simulating a saturation error of controllable magnitude and sense so as to effect a desired modification of the saturation of a color reproduction of said televised scene effected in response to said color difference signals and said luminance component.*

*11. In a color television receiver adapted to receive a television signal including a luminance component, a chrominance component comprising a color subcarrier modulated in both phase and amplitude, periodically recurring color synchronizing bursts occupying prescribed intervals during the horizontal retrace portions of said signal and a color reference signal, of color subcarrier frequency and of a reference phase and amplitude, occupying a prescribed interval during the vertical retrace portion of said signal, apparatus comprising:*

*first means for providing an oscillatory signal to demodulate said chrominance component and produce color difference signals containing information proportional to the hue and saturation of the televised scene;*

*second means responsive to said television signal for recovering the color synchronizing bursts therefrom and for coupling said bursts to said first means to lock at least the frequency of the oscillatory signal provided thereby to the frequency of such bursts;*

*third means, also responsive to said television signal, for recovering said color reference signal and for utilizing said signal to develop a control signal for said first means; said third means comprising (a) an amplifier for said chrominance and color reference signal components of said television signal, (b) a first chrominance component demodulator responsive to respective outputs of said first means and said amplifier and effecting demodulation of said modulated color subcarrier along a demodulation axis in quadrature relationship to said reference phase to develop a first color difference signal, and (c) means for sensing the output of said first demodulator during said prescribed vertical retrace interval for developing said control signal for said first means to adjust the phase of said oscillatory signal as a function of the phase of said reference signal; and*

*fourth means responsive to respective outputs of said first means and said amplifier for controlling the amplitude of said color difference signals and the saturation of the reproduced color image via adjustment of the gain of said amplifier as a function of the amplitude, with respect to a reference level, of said amplified reference signal; said fourth means comprising a second chrominance component demodulator responsive to outputs of said first means and said amplifier and effecting demodulation of said modulated color subcarrier along a second demodulation axis in quadrature relationship to said first demodulation axis to develop a second color difference signal, means for matrixing the output of said second demodulator with said luminance component, means responsive to the output of said matrixing means during said prescribed vertical retrace interval for developing a gain control voltage, and means for utilizing said gain control voltage to control the gain of said amplifier; said reference level being responsive to the level of said lumi-*

*nance component supplied to said matrixing means during said prescribed vertical retrace interval; and*

*wherein the color-difference signals developed by said first and second demodulators in response to said chrominance component are utilized in development of a color reproduction of said televised scene.*

*12. Apparatus in accordance with claim 11 also including fifth means for selectively causing said matrixing means to provide an output during said prescribed vertical retrace interval which is inclusive of a component simulating a saturation error of controllable magnitude and sense so as to effect a desired modification of the saturation of said color reproduction of said televised scene.*

*13. Apparatus in accordance with claim 12 wherein said fifth means comprises means for modifying one of the signal inputs to said matrixing means, said signal input modifying means including a potentiometer with a tap subject to manual adjustment of its position to control the modification of said one signal input in such manner that the existence, magnitude and sense of said simulated saturation error is dependent upon the position of adjustment of said tap.*

*14. In a color television receiver adapted to receive a television signal including a luminance component having a given level representative of black, a chrominance component comprising a color subcarrier modulated in both phase and amplitude, periodically recurring color synchronizing bursts occupying prescribed intervals during the horizontal retrace portions of said signal and a color reference signal, of color subcarrier frequency and of a reference phase and amplitude, occupying a prescribed interval during the vertical retrace portion of said signal and superimposed upon a pedestal shifted in the white direction from said black representative level, apparatus comprising:*

*first means for providing an oscillatory signal to demodulate said chrominance component and produce color difference signals containing information proportional to the hue and saturation of the televised scene;*

*second means responsive to said television signal for recovering the color synchronizing bursts therefrom and for coupling said bursts to said first means to lock at least the frequency of the oscillatory signal provided thereby to the frequency of such bursts;*

*third means, also responsive to said television signal, for recovering said color reference signal and for utilizing said signal to develop a control signal for said first means; said third means comprising the combination of (a) a frequency selective amplifier for amplifying the chrominance and color reference signal components of said television signal, (b) a first chrominance component demodulator responsive to respective outputs of said first means and said amplifier and effecting demodulation of said modulated color subcarrier along a demodulation axis in quadrature relationship to said reference phase to develop a first color difference signal, and (c) means for sensing the output of said first demodulator during said prescribed vertical retrace interval for developing said control signal for said first means to adjust the phase of said oscillatory signal as a function of the phase of said reference signal;*

*a second chrominance component demodulator responsive to respective outputs of said first means and said amplifier and effecting demodulation of said modulated color subcarrier along a second demodulation axis in quadrature relationship to said first demodulation axis to develop a second color-difference signal;*

*means for matrixing the output of said second demodulator with a signal which is representative of said pedestal during said prescribed vertical retrace interval;*

*means responsive to the output of said matrixing means during said prescribed vertical retrace interval for developing a gain control voltage; and*

*means for utilizing said gain control voltage to control the gain of said amplifier;*

*wherein the color-difference signals developed by said first and second demodulators in response to said chrominance component are utilized in development of a color reproduction of said televised scene.*

* * * * *